United States Patent
Hertz et al.

(10) Patent No.: US 8,092,555 B2
(45) Date of Patent: *Jan. 10, 2012

(54) CONCRETE COLORING COMPOSITIONS AND METHODS

(75) Inventors: Sanford Lee Hertz, Hoffman Estates, IL (US); Ed Daraskevich, Oswego, IL (US); William Tao, Downers Grove, IL (US); Jason J. Netherton, Kenosha, WI (US); Matthew S. Gebhard, Cary, IL (US); T. Howard Killilea, North Oaks, MN (US); Kevin W. Evanson, Maple Grove, MN (US)

(73) Assignee: Valspar Corporation, Minneapolis, MN (US)

( * ) Notice: Subject to any disclaimer, the term of this patent is extended or adjusted under 35 U.S.C. 154(b) by 88 days.

This patent is subject to a terminal disclaimer.

(21) Appl. No.: 12/291,316

(22) Filed: Nov. 7, 2008

(65) Prior Publication Data

US 2009/0139435 A1   Jun. 4, 2009

Related U.S. Application Data

(63) Continuation-in-part of application No. 11/746,657, filed on May 10, 2007.

(51) Int. Cl.
*C04B 41/45* (2006.01)
(52) U.S. Cl. .................................. 8/522; 8/658
(58) Field of Classification Search .............. 8/522, 523; 106/712
See application file for complete search history.

(56) References Cited

U.S. PATENT DOCUMENTS

| | | | |
|---|---|---|---|
| 3,930,740 A | 1/1976 | Bowman | |
| 5,120,611 A | 6/1992 | Ogura | |
| 5,609,681 A | 3/1997 | Drs et al. | |
| 5,672,279 A * | 9/1997 | Sargent et al. | 210/698 |
| 5,733,463 A | 3/1998 | Sargent et al. | |
| 5,735,094 A | 4/1998 | Zember | |
| 6,294,011 B1 * | 9/2001 | Hedouin et al. | 106/439 |
| 6,500,249 B1 * | 12/2002 | Dodson | 106/34 |
| 6,528,120 B2 | 3/2003 | Brown | |
| 6,596,074 B2 | 7/2003 | Pomeroy | |
| 6,652,907 B1 | 11/2003 | Stever | |
| 6,884,753 B2 | 4/2005 | Sakatani et al. | |
| 7,071,153 B2 | 7/2006 | Lewis et al. | |
| 7,658,805 B2 | 2/2010 | Netherton | |
| 2003/0146538 A1 | 8/2003 | Sambrook et al. | |
| 2004/0151950 A1 * | 8/2004 | Good | 428/703 |
| 2004/0231252 A1 * | 11/2004 | Benjamin et al. | 52/79.1 |
| 2005/0208285 A1 * | 9/2005 | Lyons et al. | 428/292.1 |
| 2006/0030490 A1 | 2/2006 | Hayashi et al. | |
| 2006/0063689 A1 | 3/2006 | Netherton | |
| 2006/0157895 A1 | 7/2006 | Watling | |
| 2006/0167178 A1 | 7/2006 | Kitamura et al. | |
| 2007/0110981 A1 | 5/2007 | Killilea et al. | |
| 2008/0187668 A1 | 8/2008 | Auger | |
| 2009/0208763 A1 | 8/2009 | Harris | |

OTHER PUBLICATIONS http://netcomposites.com, Guide to Composites, Polyester Resins, Feb. 23, 2007.
Hawley's Condensed Chemical Dictionary, entry on "pk," Copyright 2002.
PCT/US09/05984 International Search Report and Written Opinion, mailed Jan. 11, 2010.

* cited by examiner

*Primary Examiner* — Harold Pyon
*Assistant Examiner* — Katie L Hammer
(74) *Attorney, Agent, or Firm* — Kagan Binder, PLLC

(57) ABSTRACT

The present invention provides acidic compositions and methods that are adapted to impart color to cementitious or mineral substrate surfaces. Specifically, the present invention relates to acidic compositions and methods adapted to treat cementitious or mineral substrate surfaces that have the advantage of using a less corrosive acid-based solution. The acidic composition incorporates species including a weak base in equilibrium with a conjugate acid. The presence of such species moderates the corrosive behavior of the acid while still allowing excellent coloring action to occur.

22 Claims, No Drawings

CONCRETE COLORING COMPOSITIONS AND METHODS

PRIORITY CLAIM

The present non-provisional patent application is a continuation-in-part of and claims priority under 35 USC §120 from U.S. patent application having Ser. No. 11/746,657, filed on May 10, 2007, by an inventorship including Sanford Lee Hertz, and titled WEAK ACID BASED CONCRETE STAIN, wherein the entirety of said provisional patent application is incorporated herein by reference.

FIELD OF THE INVENTION

The present invention relates generally to compositions and methods that are adapted to impart color to cementitious or mineral substrate surfaces.

BACKGROUND

Cement-based compositions enjoy broad application in construction materials (e.g., cementation siding and trim products such as fibercement products), tile setting, wall and pool plasters, stucco, self leveling compounds, roofing tiles and cement patches. Concrete and like materials are produced from the alkaline earth metals typically by mixing Portland cement with sand, gravel, fibers, and water. The reaction of the cement with the water produces among other things metal carbonates such as calcium carbonate. The calcium carbonate in the mixture is insoluble in water but reacts readily with most acids.

There has been a desire for some time to produce colored concrete to improve the decorative appearance of the concrete or cement-based compositions. For example, U.S. Pat. No. 3,930,740 discloses tools for imprinting non-repeating stone patterns in fresh concrete to which color is added. U.S. Pat. No. 5,735,094 discloses a process for applying an ornamental coating comprised of liquid mortar that includes a color pigment. The addition of dyes and pigments to the cementitious materials has also enjoyed wide application in all of the above-mentioned materials.

There are several processes for coloring or ornamenting a concrete surface that are known in the art. These include sweeping partially set concrete to produce a broom surface or adding a coloring agent that is mixed into the concrete blend. However, afterwards, a thorough clean-up of the applicator equipment is necessary, resulting in considerable labor and expense. This method is costly and inefficient, as coloring agents are expensive, become mixed throughout the concrete, and are only needed at the surface where they are visible. More elaborate surface treatments are known, including embedding stones varying in size or color into concrete areas by means of cement or resin.

One of the more common processes known in the art for coloring or staining concrete involves washing a concrete surface with an acidic solution containing a metallic salt (also referred to herein as a "metal salt"). This contact helps cause the surface to develop color. After application of the acidic staining solution and development of the color, a neutralizing agent is commonly applied to the stained concrete, and a clear protection polymeric sealer coating is applied. The clear top coat helps to further realize the color development.

A second common method in the art of coloring concrete involves washing the concrete surface with an acidic solution to roughen or etch the surface; using a mixture of common baking soda and water to neutralize and rinse away the etching solution; and coloring the surface with a polymer based stain or paint; and finishing the surface with a clear coating.

Another known process involves acid etching with a mineral acid such as hydrochloric acid or diamond grinding a concrete surface, followed by application of cementitious overlay. This process is described in Bob Harris' Guide to Concrete Overlays & Toppings (Decorative Concrete Institute 251 Villa Rosa Road Temple, Ga. 30179). After the cementitious overlay has appropriately set, it can be stained with an acidic solution containing a metallic salt. These staining techniques, which employ an acidic solution containing a metallic salt, are desirable because they offer highly durable light fast coloration of the concrete. Typically these processes involve the use of highly corrosive acidic solutions, which are dangerous to handle. Many other desirable techniques for staining concrete are described in Bob Harris' Guide to Stained Concrete Interior Floors (Decorative Concrete Institute 251 Villa Rosa Road Temple, Ga. 30179).

SUMMARY OF THE INVENTION

The inventors have discovered that incorporating a weak base into acid-based coloring compositions also including suitable metal salt(s) can moderate the corrosive characteristics of the acid while still allowing effective coloring to occur. In representative embodiments, the base is in equilibrium in aqueous media with a conjugate acid to moderate the corrosive characteristics of the acid. The incorporation of a weak base into acidic coloring compositions provides an effective and safer means to stain cementitious substrates. Although the compositions can be derived from separate ingredients comprising the desired acid and weak base, the compositions are easier to manufacture from easily and safely handled ingredients, such as salts of a protonated form of the weak base. Acidic and basic characteristics then form in situ when such a salt is dissolved in an aqueous medium. For example, a representative embodiment of a salt of a protonated weak base is urea monohydrochloride, which is a commercially available, stable solid. When dissolved in water, an acidic solution results that also comprises aqueous species in equilibrium derived from the urea.

In contrast, traditional concrete acid stains use an acid such as hydrochloric acid to decompose the calcium carbonate and calcium oxide in the concrete and to facilitate the ion exchange with the metallic salt, but this is done without the presence of effective amounts of any weak base or conjugates thereof. While the acid and metallic salts alone do impart color to the surface of the material, the use of only acid and metallic salt without the moderating effects of a base tends to involve the production of excessive fumes of hydrogen chloride. In addition, the conventional hydrochloric acid solution is very corrosive and thus dangerous to prepare, handle, and use.

An additional advantage of combining an acid with a weak base is that the stained concrete self-neutralizes during the staining process. This eliminates the need to go through a neutralization step before rinsing, although neutralizing steps can still be practiced if desired. In contrast, typically, conventional acid stains must be rinsed after application to remove excessive salt precipitate. Conventional acid stains that use hydrochloric acid must be neutralized prior to rinsing, or the runoff from the rinse can stain adjacent concrete. Typical neutralizing agents used are ammonia or sodium hydroxide, or baking soda solutions.

The compositions of the present invention also can be used in any of the staining methods described in Bob Harris' Guide to Stained Concrete Interior Floors (Decorative Concrete Institute 251 Villa Rosa Road Temple, Ga. 30179.

In one aspect, the present invention relates to a method, comprising the step of applying to the surface of a cementitious or mineral substrate a composition including (i) an acid which has a pKa less than 6; (ii) a weak base, wherein the conjugate acid of the weak base has a pKa less than 7 and greater than the pKa of the acid; and (iii) one or more metal salts capable of imparting a color when the composition is applied to a cementitious or mineral substrate. The treatment may be used to alter the color of the surface. After treatment, a protective top coating optionally can be applied to the treated surface. Such top coatings not only help protect the surface, but they also can help further develop the color of the surface. The method is particularly useful for treating fibercement building products. In another aspect, the present invention relates to stained substrates, including but not limited to fibercement building products, prepared according to these methods.

In another aspect, the present invention relates to a method, comprising the steps of applying to at least a portion of the surface of a fiber cement substrate a composition comprising a reaction mixture of (i) an acid which has a pKa less than 6; (ii) a weak base, wherein the conjugate acid of the weak base has a pKa less than 7 and greater than the pKa of the acid; and (iii) one or more metal salts capable of imparting a color when the composition is applied to a fiber cement substrate; and applying a protective coating to cover the fiber cement surface.

In another aspect, the present invention relates to a method, comprising the steps of: (a) incorporating a salt of a protonated base into an aqueous liquid carrier, said protonated base having a pKa of less than about 7; (b) incorporating a salt of a transition metal into the aqueous liquid carrier; and (c) causing the composition to contact the cementitious surface.

In another aspect, the present invention relates to a system, comprising: (a) a cementitious surface; and (b) an aqueous composition in contact with the surface, said composition comprising (i) aqueous species comprising a weak base in equilibrium with a conjugate acid of the weak base, said conjugate acid of the weak base having a pKa of less than about 7; and (ii) aqueous species comprising a transition metal ion and a corresponding anion, wherein the salt corresponding to the transition metal ion and the anion is a Lewis acid.

In another aspect, the present invention relates to a method, comprising the steps of applying to at least a portion of the surface of a fiber cement substrate an acidic composition comprising a reaction mixture of (i) an acid which has a pKa less than 6; and (ii) one or more metal salts capable of imparting a color when the composition is applied to a fiber cement substrate; and applying a radiation cured protective coating to cover the fiber cement surface.

DETAILED DESCRIPTION OF THE INVENTION

The current invention relates to compositions (e.g., solutions and dispersions) and methods for imparting color to a cementitious or mineral substrate using these compositions. Preferably, the compositions are aqueous, but may optionally include one or more other liquid carriers. As used herein, a "cementitious substrate" is meant to include traditional cement substrates as well as any composites incorporating cementitious and other ingredients. Cement generally is an inorganic binder that cures in the presence of aqueous media. Examples of cements include portland cement, non-portland cement, and blends derived from these. Examples of portland cement and blends thereof include blastfurnace cement, fly-ash cement, Pozzolan cement, silica fume cement, masonry cement, expansive cement, colored cement, and the like. Non-portland cements include Plaster of Paris, pozzolan lime cement, slag-lime cement, supersulfated cement, calcium aluminate cement, calcium sulfoaluminate cement, natural cement, and geopolymer cement. According to one categorization, cements can be hydraulic or non-hydraulic. Cements are used to produce concrete, mortar, tile, building materials such as siding products, bricks, synthetic stones roads, walkways, furniture, vessels, fluid conduits, and the like. Thus, a cementitious material includes the composite known as fibercement. Fibercement is a composite that is used widely to produce building materials, particularly siding used to cover the exteriors of commercial, residential, farming, or other structures. Fibercement generally is a composite that incorporates a cement binder and one or more organic or inorganic fibers. Cellulose fibers are commonly used in fibercement. Fibercement may also include one or more other ingredients commonly added to cement products including sand, vermiculite, perlite, clay, and/or the like.

Consequently, a "cementitious substrate" would specifically include fibercement building products, for example, several preferred fiber cement siding products are available from James Hardie Building Products Inc. of Mission Viejo, Calif., including those sold as HARDIEHOME™ siding, HARDIPANEL™ vertical siding, HARDIPLANK™ lap siding, HARDIESOFFIT™ panels, HARDITRIM™ planks and HARDISHINGLE™ siding. Other suitable fiber cement siding substrates include AQUAPANEL™ cement board products from Knauf USG Systems GmbH & Co. KG of Iserlohn, Germany, CEMPLANK™, CEMPANEL™ and CEMTRIM™ cement board products from Cemplank of Mission Viejo, Calif.; WEATHERBOARDS™ cement board products from CertainTeed Corporation of Valley Forge, Pa.; MAXITILE™, MAXISHAKE™ AND MAXISLATE™ cement board products from MaxiTile Inc. of Carson, Calif.; BRESTONE™, CINDERSTONE™, LEDGESTONE™, NEWPORT BRICK™, SIERRA PREMIUM™ and VINTAGE BRICK™ cement board products from Nichiha U.S.A., Inc. of Norcross, Ga., EVERNICE™ cement board products from Zhangjiagang Evernice Building Materials Co., Ltd. of China and E BOARD™ cement board products from Everest Industries Ltd. of India.

The compositions desirably are acidic and incorporate aqueous species of a weak base in equilibrium with a conjugate acid and one or more aqueous species of one or more metal salts. Such metal salts may be Lewis acids in some embodiments. As used herein, a weak base refers to a base whose conjugate acid has a pKa of less than about 7, preferably in the range from about −1 to about 7, more preferably about −1 to about 5, most preferably about −1 to about 3. Desirably, the compositions are acidic and may include aqueous species corresponding to an acid with a pKa of less than 6, aqueous species corresponding to a weak base such that the conjugate acid of the weak base has a pKa of less than 7 and greater than the pKa of the acid, and one or more water soluble metal salts. In various embodiments, the water-soluble metal salts of the composition can include salts of the transition elements. In some embodiments, the weak base can decompose when it is applied to the cementitious materials such that the decomposition products are also bases. For instance, without wishing to be bound by theory, it is believed that aqueous urea species can decompose to form products including ammonia.

The strength of a base is defined by the pKa of a conjugate acid. The higher the pKa of the base's conjugate acid the stronger the base. For example acetate is a weak base where the conjugate acid (acetic acid) has a pKa of 4.75. Lactate is a weak base where the conjugate acid (lactic acid) has a pKa of 3.86. Given this definition, acetate would be considered a stronger base than lactate. Certain embodiments will include a weak base that can decompose into one or more components that have a vapor pressure greater than 0.01 psi at 25° C. upon application to substrate. For instance, without wishing to be bound, it is believed that aqueous urea species can decompose to ammonia and carbon dioxide as well as water. In some embodiments, the aqueous acid corresponds to a hydrogen halide such as HCl. In yet others, the weak base preferably comprises aqueous urea species.

Weak bases useful in the present invention include:
1) substituted ureas of the following formula

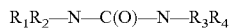

where $R_1$, $R_2$, $R_3$ and $R_4$ are C1-C10 carbon groups or hydrogen, including for example urea, tetramethyl urea, acetylurea, imidazolidinone, or substituted imidazolidones, pyrimidinone, pyrimidinedione, and the like;
2) amides such as formamide, and dimethyl formamide, or acetamides such as dimethyl acetamide, caprolactam; and, pyrollidone;
3) esters of carbonic acid such as alkyl and aryl carbonates, such as dimethyl carbonate, propylene carbonate, ethylene glycol bis methyl carbonate, ethyl M-tolyl carbonate;
4) carbamates such as alkyl and aryl carbamates, such as ethyl ethylcarbamate, oxazolidinone, and oxazolidinedione; and,
5) amino acids such as glycine, alanine, leucine, valine, phenylalanine, aspartic acid, glutamic acid, cysteine, lysine, and histidine.

Additional examples of weak bases include alkanolamines, including triethanolamine, diethanolamine, monoethanolamine and alkoxylated amines of the following formula $(HO-[(R)O]_x-R)_y-NH_{3-y}$, wherein each R independently is a C2 to C8 alkyl group, and x can vary from 1 to 100, and y can vary from can vary from 1 to 3; polymers with nitrogen-containing heterocyclic groups (including but not limited to pyridine, pyrimidine, imidazole, tetrazole, pyrazine, quinoline, isoquinoline, indole, isoindole, benzimidazole, purine, pyrrole, isopyrazole, quinazoline, pyridazine, pyrazine, cinnoline, phthalazine, quinoxaline, xanthine, hypoxanthine, and pteridine); polymers and copolymers of acrylamide, and cyclic amides such as caprolactam; pyrollidone, polyvinyl pyrollidone, copolymers of vinyl pyrollidone, methacrylamide, polymethacrylamide, copolymers of methacrylamide, ammonia, guanidine, hydroxyurea, semicarbazide; mono-, di-, or tri(alkyl or aryl)urea, and wherein in the case of di(alkyl or aryl)urea the alkyl or aryl groups can be on the same or different nitrogen atoms, O-methyl hydroxyl amine (methoxylamine), aniline, and hydrazine. Preferred bases are nitrogenous bases. Preferred are substituted ureas. Most preferred is urea.

In preferred embodiments, the amount of weak base utilized may be determined by stoichiometric balance with the acid equivalents. The molar equivalents of acid may be determined from the total number of protons per mole of acid that can be ionized at pH values below pH 9.0. For example, (i) hydrochloric acid has one ionizable proton per mole of hydrochloric acid; (ii) sulfuric acid has two ionizable protons per mole of sulfuric acid; and (iii) phosphoric acid only has two ionizable protons per mole of phosphoric acid, and one proton which can be ionized at pH values above 9.0. Preferred compositions include at least 5%, more preferably at least 10%, and more preferably at least 50% molar equivalents of weak base based on the total molar equivalents of acid. Preferred compositions include less than 200%, more preferably less than 175%, and more preferably less than 150% molar equivalents of weak base based on the total molar equivalents of acid.

In some embodiments, the equivalents of acid can be derived from multiple sources. For instance, if the solution is derived from a first acid source and a metal salt that is also a Lewis acid, both the first acid source and the metal salt contribute acid equivalents to the composition. An illustrative embodiment of such a coloring composition of the invention could be derived from ingredients including urea monohydrochloride, which can be viewed as a first acid source, and a coloring salt that is a Lewis acid such as $FeCl_2$. It is believed that the urea monohydrochloride contributes one mole of hydrogen ions and one mole of chloride ions per mole of added urea monhydrochloride, and the ferrous chloride adds two moles of hydrogen ions and two moles of chloride ions per mole of added ferrous chloride. Thus, both of these ingredients will contribute acid equivalents corresponding to aqueous HCl when dissolved in water.

Acids useful in the present invention can include carboxylic acids such as acetic, maleic, citric, formic, and benzoic; phosphoric; phosphonic such as ethyl phosphonic acid; polyphosphoric acids such as pyrophosphoric, and hexameta phosphoric; sulfuric; sulfonic such as benzyl sulfonic acid; nitric or nitrous acid; hydrogen halides such as hydrogen fluoride, hydrogen chloride, hydrogen bromide, and hydrogen iodide. Preferred are phosphoric and polyphosphoric acids, nitric or nitrous acid, and hydrogen chloride. More preferred are phosphoric, pyrophosphoric, and hydrogen chloride. Most preferred is hydrogen chloride.

Preferred compositions include a sufficient amount of acid such that the pH of the resultant composition is less than about 6, preferably less than about 4, more preferably less than about 2, and most preferably less than about 1. In such compositions, the pH preferably is greater than about −2, more preferably greater than about −1. In many representative compositions, this corresponds to compositions that include at least 0.25%, more preferably at least 0.5%, and most preferably at least 1% acid by weight based on the total weight of the composition. Preferred compositions include less than 20%, more preferably less than 15%, and most preferably less than 10% acid by weight based on the total weight of the composition. Suitable acids preferably have a pKa of less than 6, more preferably less than 5, most preferably less than 3, and optimally less than 1.

In many embodiments, the desired acid(s) may be added to the compositions directly to provide the desired acidic pH characteristics. Alternatively, nonacidic ingredients, such as salts of a protonated base that form acidic species in situ, can also be used.

Preferred compositions contain metal ions, which are typically introduced as water soluble or acid soluble metal salts. Metal salts useful in the various compositions of the invention can include chloride, sulfate, nitrate, nitrite, phosphate, or phosphonate salts of titanium, vanadium, chromium, manganese, iron, cobalt, nickel, copper, aluminum, magnesium, or barium. Specific examples of suitable metal salts include but are not limited to $VCl_3$, $Cr(CH_3CO_2)_3$, $Cr(CH_3CO_2)_2$, $CrCl_3$, $CrCl_2$, $Cr_2(SO_4)_3$, $Cr(SO_4)$, $Cr(NO_3)_3$, $CrPO_4$, $MnCl_2$, $Mn_2(PO_4)_3$, $MnSO_4$, $Mn(NO_3)_2$, $MnCO_3$, $FeCl_2$, $FeCl_3$, $FeSO_4$, $Fe_2(SO_4)_3$, $FePO_4$, $Fe(H_2NSO_3)_2$, $Fe(NO_3)_3$, $Fe(C_2O_4)$, $CoCl_2$, $CoCl_3$, $CoSO_4$, $Co(NO_3)_2$, $CuCl$, $CBrI_2$, $CuCl_2$, $Cu(CH_3CO_2)_2$, $Cu(HCO_2)_2$, $Cu(C_2O_4)$, $CuCO_3$, $CuSO_4$, Cu(NO$_3$)$_2$, NiCl$_2$, and NiCl$_3$. Preferred metal salts include salts of Fe, Cr, Mn, Cu, and Co.

The unit of measurement for the metal salt is weight percent of metal ions based on total composition weight. For example if 10 grams of anhydrous ferrous chloride (FeCl$_2$) is added to 90 grams of water then the resulting composition contains 4.41% of iron (Fe(II)) ion. Suitable compositions can include more than one type of metal ion such as for example iron and copper ions. Preferred compositions include at least 0.1%, more preferably at least 0.2%, and most preferably at least 0.5% by weight of total metal ion based on total composition weight. Preferred compositions include less than 25%, more preferably less than 20%, and most preferably less than 15% by weight of total metal ion based on total composition weight.

The compositions of the present invention can further comprise one or more optional additives. One optional additive is a metal ion complexing agent that can help facilitate reaction with the substrate and/or modulate solubility of composition ingredients. Examples of complexing agents include EDTA; amino phosphonates, such as those sold under the trade name Dequest™; phosphates; and polyphosphates. Other optional additives include surfactants, defoamers, dispersants, or organic solvents (including additives capable of improving the wetting of the composition). Mixtures of these optional additives may also be used.

In addition to water, aqueous embodiments of the coloring compositions may include one or more optional solvents. Suitable optional solvents include: water miscible solvents such as methanol, ethanol, isopropanol, n-propanol, acetone, ethylene glycol alkyl ethers, propylene glycol alkyl ethers and diacetone alcohol; and water immiscible solvents such as alkyl acetates, butyl acetate, methyl isoamyl ketone, amyl acetate, diisobutyl ketone, xylene, toluene, butanol, and mineral spirits. Suitable optional defoamers include: silicone, petroleum, mineral, natural oil, or polymeric defoamers, and mixtures of these defoamers. When used, the amount of defoamer is preferably between 0.005% and 5%, more preferably between 0.01% and 4%, and more preferably is between 0.05% and 3% by weight based on total composition weight.

Typical surfactants can include anionic and nonionic surfactants. When used, the amount of surfactant is preferably between 0.05% and 5%, more preferably between 0.1% and 4%, and more preferably is between 0.2% and 3% by weight based on total composition weight. Suitable anionic surfactants include, for example, the higher fatty alcohol sulfates, such as sodium lauryl sulfate; alkylaryl sulfonates such as sodium or potassium isopropylbenzene sulfonates or isopropyl naphthalene sulfonates; alkali metal higher alkyl sulfosuccinates, such as sodium octyl sulfosuccinate, sodium N-methyl-N-palmitoyllaurate, sodium oleyl isothionate; alkali metal salts and ammonium salts of alkylarylpolyethoxyethanol sulfates, sulfonates, or phosphates, such as sodium tert-octylphenoxypolyethoxyethyl sulfate having 1 to 50 oxyethylene units; alkali metal salts and ammonium salts of alkyl polyethoxyethanol sulfates, sulfonates, and phosphates; and alkali metal salts and ammonium salts of aryl polyethoxyethanol sulfates, sulfonates, and phosphates.

Suitable nonionic surfactants include alkylphenoxypolyethoxyethanols having alkyl groups of from about 7 to 18 carbon atoms and from about 6 to about 60 oxyethylene units, such as heptylphenoxypolyethoxyethanols, methyloctyl phenoxypolyethoxyethanols; polyethoxyethanol derivatives of methylene-linked alkyl phenols; sulfur-containing agents such as those made by condensing from about 6 to 60 moles of ethylene oxide with nonyl mercaptan, dodecyl mercaptan, or with alkylthio-phenols wherein the alkyl groups contain from 6 to 16 carbon atoms; ethylene oxide derivatives of long chained carboxylic acids, such as lauric acid, myristic acid, palmitic acid, oleic acid, or mixtures of acids such as those found in tall oil containing from 6 to 60 oxyethylene units per molecule; analogous ethylene oxide condensates of long chained alcohols such as octyl, decyl, lauryl, or cetyl alcohols, ethylene oxide derivatives of etherified or esterified polyhydroxy compounds having a hydrophobic hydrocarbon chain, such as sorbitan monostearate containing from 6 to 60 oxyethylene units; block copolymers of ethylene oxide section combined with one or more hydrophobic propylene oxide sections.

Typical dispersants can include polymers and copolymers of ethylenically unsaturated carboxylic acids such as (meth)acrylic acid, fumaric acid, itaconic acid, maleic acid, maleic anhydride, and monoesters of fumaric acid; phosphorus acid monomers such as phosphoethyl(meth)acrylate and allyl phosphonic acid; and sulfur acid monomers such as 2-acrylamido-2-methyl-1-propanesulfonic acid, sulfoethyl (meth)acrylate, and vinyl sulfonic acid. This would include dispersants marketed under the trade name Tamol™. Citric acid, oxalic acid, phosphoric acid, pyrophosphoric acid, and poly phosphoric acids may also be employed.

The current invention also provides methods for staining the surface of a cementitious or mineral substrate comprising applying any of the compositions described herein to the surface of a cementitious or mineral substrate. The methods can be done in a single operation comprising:

completely wetting the surface with an excess of the stain composition (e.g., solution or dispersion), permitting the composition to react with the substrate and develop color, permitting the stain to dry in place optionally applying an acid neutralizing composition (e.g., solution or dispersion) to the stained cementitious or mineral surface.

Neutralizing compositions (e.g., solutions or dispersions) can include aqueous mixtures (preferably solutions) of weak bases such as carbonate and bicarbonate salts such as sodium, potassium, lithium, cesium, ammonium (bi)carbonate; or phosphate salts such disodium, dipotassium, dilithium, dicesium, or diammonium phosphate; or organic alkalinity sources such as alkylamines and alkanolamines.

Preferred neutralizing solution contain preferably at least 10% molar equivalents of weak base, such as Sodium Bicarbonate, based on the total acid equivalents in the acid staining composition, more preferably at least 50% molar equivalents of weak base based on the total acid equivalents in the acid staining composition, and most preferably at least 100% molar equivalents of weak base based on the total acid equivalents in the acid staining composition.

The practice of the present invention may further involve applying an at least partially transparent, protective coating onto the previously stained cementitious or mineral substrate. The protective coating can be applied directly on the substrate. Alternatively, one or more intervening layers may be interposed between the substrate and the protective coating. Often, the application of a protective coating, particularly those that are substantially transparent, enhances and further realizes the color development of the stained substrate.

A wide variety of protective coatings may be used. Under certain circumstances it may be desirable to apply a wax clear coating to the previously stained substrate (e.g., concrete, cementitious or mineral substrate). Typical waxes useful in the present invention include: natural plant or beeswaxes, paraffin, carnauba, and these aforementioned natural waxes modified with organic polymers such as polyethylene, polypropylene, or polytetrafluoroethylene.

Polymeric protective coatings also may be used. Typical polymers useful in the present invention to form protective coatings include: acrylic, styrene-acrylic, polyurethane, polyester, alkyd, epoxy-ester, silicone, and epoxy-amide. It is particularly advantageous to utilize polymer chemistries which crosslink after application over the stained concrete. Examples of suitable crosslinking polymers would be those employing air curable drying oil functionality, epoxy-amide reactions, siloxane condensation, hydrazide-carbonyl reactions, aziridine-acid reactions, isocycante-hydroxy reactions, or carbodiimide-acid reactions. Also suitable are radiation curable (e.g., UV, visible or electron-beam curable) coatings. Preferred are those chemistries that offer a high degree of wear resistance. For consumer or field-applied applications, most preferred are air drying epoxy-esters, two component epoxy amides, air curable alkyds, and aziridine crosslinked polyurethanes. For factory-applied uses (e.g., when manufacturing stained fiber cement substrates) it is preferred to use two-component crosslinking technologies (e.g. isocyanate, melamine, unsaturation, or epoxy crosslinking), powder coatings, laminates, waterborne thermoplastic coating systems (e.g., latex, more preferably a crush resistance latex such as is described in U.S. patent application Ser. No. 11/560,329), fluoropolymer, thermal or radiation cure coatings (ultraviolet light (UV), visible light, near infra-red (NIR), or e-beam cured), and the like. Preferred factory applied finishes are radiation curable waterborne or 100% solids coatings.

Suitable radiation curable protective coating compositions may include olefinic oligomers or polymers, which may be anhydrous or waterborne. One example of a suitable olefinic oligomeric or polymeric material is a (meth)acrylate material. As used herein a reference to a (meth)acrylate material is meant to include methacrylate materials and acrylate materials. Suitable olefinic oligomers or polymers include urethanes, epoxies, acrylics, polyesters, melamines, amines and mixtures thereof. Suitable urethanes include CN 929, CN 963, CN 980, CN 981, CN 982, CN 983, CN 9001 from SARTOMER, and Bayhydrol 2348, 2282, and 2317 from BAYER Material Sciences. Suitable epoxies include CN 104, CN 120, CN121 and CN 151 from SARTOMER. Suitable acrylics include CN 816 from SARTOMER, Suitable polyesters include CN2200, CN2257, CN2258, CN2259, and CN2260 from SARTOMER. Suitable melamines include CN 9890 from SARTOMER. Suitable amines include CN 501, CN 550, CN 551, and CN 2100 from SARTOMER.

The radiation curable coating composition may include a crosslinkable diluent. The crosslinkable diluent typically includes olefinic monomer material for crosslinking with the unsaturated oligomers or polymers and for decreasing the viscosity of the coating so that standard coating techniques and equipment can be used. One example of suitable olefinic monomer material is (meth)acrylate monomer material. Suitable (meth)acrylate monomers which may be employed have at least one (meth)acrylate functional group, e.g., acrylate and methacrylate compounds and functional derivatives thereof. Examples of (meth)acrylate monomer materials include mono-, di-, tri-, tetra- and penta-functional (meth)acrylate materials typically having a molecular weight in the range of about 50 to about 750. Many such materials, are described in P. K. T. Oldring *Chemistry & Technology of UV & EB Formulation for Coatings, Inks & Paints*", Volume II, 1991, SITA Technology. When the (meth)acrylate monomer material is used, it is preferably about 10 to 70 wt. %, and more preferably about 20 to 60 wt. %, of the coating composition.

Suitable (meth)acrylate monomer materials may include one or more different (meth)acrylate monomers, each monomer having one or more (meth)acrylate groups. The (meth) acrylate functional groups of the (meth)acrylate monomers are bonded to core structural groups which may be based on a wide variety of organic structures including tripropylene glycol, isobornyl alcohol, isodecyl alcohol, phenoxyethyl alcohol, trishydroxyethyl isocyanurate, trimethylolpropane ethoxylate, hexanediol, ethoxylated and propoxylated neopentyl glycol, oxyethylated phenol, polyethylene glycol, bisphenol ethoxylate, neopentyl glycol propoxylate, trimethylolpropane, propoxylated glycerol, pentaerythritol, tetrahydrofurfuryl alcohol, β-carboxyethyl alcohol, substituted derivatives of the above, combinations of the above, and the like.

One purpose of the (meth)acrylate monomer material is viscosity reduction of coating compositions that contain olefinic oligomers or polymers. In addition, (meth)acrylate monomers may confer or enhance desirable characteristics, such as chemical resistance and hardness to the coating composition. It is thought that the presence of several (meth) acrylate groups on each substituent of the monomer results in multiple interactions between each monomer and resin molecule in the cured composition. These multiple interactions can result in increased chemical resistance, abrasion resistance, and/or hardness.

Examples of suitable (meth)acrylate monomers include isobornyl(meth)acrylate, isodecyl(meth)acrylate, phenoxyethyl(meth)acrylate, trimethylolpropane tri(meth)acrylate, trimethylolpropane ethoxylate tri(meth)acrylate, tripropylene glycol di(meth)acrylate, dipropyleneglycol di(meth) acrylate, ditrimethylolpropane tetra(meth)acrylate, hexanediol di(meth)acrylate, tetrahydrofurfuryl(meth)acrylate, .beta.-carboxyethyl(meth)acrylate, bisphenol A ethoxylate di(meth)acrylate, and ethoxylated and propoxylated neopentyl glycol di(meth)acrylates.

Another example of a suitable olefinic monomer material, which may be employed as a crosslinkable diluent, is an allyl ether monomer material. Suitable allyl ether monomer materials include one or more different allyl ether monomers, each monomer having one or more allyl ether groups. The allyl ether functional groups of the allyl ether monomers are bonded to a core structural group, which is based on a wide variety of polyhydric alcohols. Suitable polyhydric alcohols include neopentyl glycol, trimethylolpropane, ethylene glycol, propylene glycol, butylene glycol, diethylene glycol, trimethylene glycol, triethylene glycol, trimethylolethane, pentaerythritol, glycerol, diglycerol, 1,4-butanediol, 1,6-hexanediol, 1,4-cyclohexanedimethanol, and the like.

Examples of suitable allyl ether monomers include hydroxyethyl allyl ether, hydroxypropyl allyl ether, trimethylolpropane monoallyl ether, trimethylolpropane diallyl ether, trimethylolethane monoallyl ether, trimethylolethane diallyl ether, glycerol monoallyl ether, glycerol diallyl ether, pentaerythritol monoallyl ether, pentaerythritol diallyl ether, pentaerythritol triallyl ether, 1,2,6-hexanetriol monoallyl ether, 1,2,6-hexanetriol diallyl ether, and the like. Propoxylated and ethoxylated forms of these compounds are also suitable.

Another example of a suitable olefinic monomer material is vinyl ether monomer material. The vinyl ether monomer material includes one or more different vinyl ether monomers, each monomer having one or more vinyl ether groups. Examples of suitable vinyl ether monomers include 4-hydroxybutyl vinyl ether, 1,4-cyclohexanedimethanol monovinyl ether, 1,4-cyclohexanedimethanol divinyl ether, ethylene glycol monovinyl ether, ethylene glycol divinyl ether, diethylene glycol monovinyl ether, diethylene glycol divinyl ether, triethylene glycol divinyl ether, and the like. Propoxylated and ethoxylated forms of these compounds are also suitable.

The crosslinkable diluent may include a mixture of (meth) acrylate, allyl ether, and vinyl ether monomer materials. In addition, the crosslinkable diluent can be supplemented by addition of other olefinic monomer materials. Such monomer materials include functional materials such as vinyl ether maleate monomers, and the like.

Some preferred coating compositions of the present invention, particularly those with (meth)acrylate functional groups, are curable by UV or visible light. These coating compositions typically include a photoinitiator that induces the curing reaction upon exposure to light. The photoinitiator typically generates free radicals in response to a particular wavelength range of light to initiate a free radical reaction that crosslinks the acrylate double bonds of the resin and (meth) acrylate monomer material, thereby curing the coating.

Among photoinitiators suitable for use in the present invention with resins having (meth)acrylate or allyl ether functional groups are α-cleavage type photoinitiators and hydrogen abstraction type photoinitiators. The photoinitiator preferably makes up about 0.5 to 15 wt. % of the coating composition. The photoinitiator may include other agents such as a coinitiator or photoinitiator synergist that aid the photochemical initiation reaction.

Suitable cleavage type photoinitiators of the invention include, α.,α.-diethoxyacetophenone (DEAP); dimethoxyphenylacetophenone (Irgacure 651); hydroxycyclo-hexylphenylketone (Irgacure 184); 2-hydroxy-2-methyl-1-phenylpropan-1-one (Darocur 1173); Irgacure 1700, and Darocur 4265 all from Ciba Corporation, Ardsley, N.Y. Irgacure 1700 is a 25:75 blend of bis-(2,6-dimethoxybenzoyl)-2, 4,4-trimethylpentyl phosphine oxide and 2-hydroxy-2-methyl-1-phenylpropan-1-one. Darocur 4265 is a 50:50 blend of 2-hydroxy-2-methyl-1-phenylpropan-1-one and 2,4,6-trimethylbenzoyldiphenylphosphine oxide (TPO). Lucirin TPO photoinitiator (2,4,6-trimethylbenzoyl-diphenylphosphine oxide) of BASF Corporation and KIP 100 photoinitiator (a mixture of 70% oligo [2-hydroxy-2-methyl-[4-(1-methylvinyl)phenyl]propan-1-one] and 30% 2-hydroxy-2-methyl-1-phenylpropan-1-one) available from Sartomer are also suitable.

Suitable hydrogen abstraction-type photoinitiators include benzophenone, substituted benzophenones (e.g., Escacure TZT of Fratelli-Lamberti) and other diaryl ketone such as xanthones, thioxanthones, Michler's ketone, benzil, quinones, and substituted derivatives of all of the above.

Irgacure 500 is a mixture of Irgacure 184 and benzophenone, in a 1:1 ratio, and is a good example of a mixture of an α.-cleavage type photoinitiator and a hydrogen abstraction-type photoinitiator. Other mixtures of photoinitiators may also be used in the coating composition. Preferred photoinitiators include Darocur 1173, KIP 100, benzophenone, and Irgacure 184. Camphorquinone is one example of a suitable photoinitiator for curing a coating composition with visible light.

The present coating composition may also include a coinitiator or photoinitiator synergist. The coinitiators can be (1) tertiary aliphatic amines like methyl diethanol amine and triethanol amine; (2) aromatic amines like amylparadimethylaminobenzoate, 2-n-butoxyethyl-4-(dimethylamino) benzoate, 2-(dimethylamino)ethylbenzoate, ethyl-4-(dimethylamino)benzoate, and 2-ethylhexyl-4-(dimethylamino) benzoate; (3) (meth)acrylated amines like Ebecryl 7100 and Uvecryl P104 and P115, all from UCB RadCure Specialties; and (4) amino-functional acrylate or methacrylate resin or oligomer blends such as Ebecryl 3600 or Ebecryl 3703, both from UCB RadCure Specialties. Combinations of the above four categories of amines may also be used.

Coating compositions with vinyl ether functional groups can be cured by UV or visible light using cationic-generating photoinitiators. Examples of suitable cationic-generating photoinitiators include super acid-generating photoinitiators, such as triarylsulfonium salts. One useful triarylsulfonium salt is triphenyl sulfonium hexafluorophosphate, $Ph_3 S^+ PF_6^-$.—(available from Union Carbide as UVI 6990).

Many coating compositions, which may be cured by UV or visible light, may also be cured with an electron beam. Techniques and devices for curing a coating composition using an electron beam are known in the art and typically do not require a photoinitiator.

The curable coating composition may also include one of a group of ingredients that can be called performance enhancing additives. The coating composition may contain more than one performance enhancing additive. Typical performance enhancing additives which may be employed in the curable coating composition include a surface active agent, a pigment, a curing indicator, a filler, a UV absorber, a hindered amine light stabilizer (HALS), and an optical brightener.

The curable coating composition may include a surface active agent which modifies the interaction of the curable coating composition with the substrate, in particular, the agent can modify the ability of the composition to wet a substrate. Surface active agents may have other properties as well. For example, surface active agents may also include leveling, defoaming, or flow agents, and the like. The surface active agent affects qualities of the curable coating composition including how the coating composition is handled, how it spreads across the surface of the substrate, and how it bonds to the substrate. The surface active agent may preferably make up about 0.1 to 3% by weight of the curable coating composition. Exemplary surface active agents include polydimethylsiloxane surface active agents (e.g., Silwet L-7602, Silwet L-7622; OSI Specialties or Byk 306, Byk-Chemie) and fluorinated surface active agents (e.g., Fluorad FC-430; 3M Company). The surface active agents may include a defoamer. Suitable defoamers include polysiloxane defoamers, such as a methylalkylpolysiloxane like Byk 077 or Byk 500 (Byk-Chemie), or polymeric defoamers (e.g., Byk 051; Byk-Chemie).

For some applications, a coating that is at least partially transparent, colored, pigmented and/or has other visual characteristics is desired. Agents to provide such properties are also included in the invention. The composition can also include a gloss control additive or an optical brightener, such as Uvitex OB, from Ciba-Geigy.

In certain instances it is advantageous to include fillers or inert ingredients in the protective coating composition. Fillers and inert ingredients include, for example, clay, glass beads, calcium carbonate, talc, silicas, organic fillers, and the like. Fillers extend, lower the cost of, alter the appearance of, or provide desirable characteristics to the composition before and after curing. Suitable fillers are known to those of skill in the art or can be determined using standard methods. Fillers or inert ingredients, when present, preferably comprise up to 40% by weight of the coating composition, more preferably from 0.5 to 40 wt. %.

The protective coating compositions may also include other ingredients such as those which modify properties of a curable coating composition as it is stored, handled, or applied, and at other or subsequent stages. Waxes, flatting agents, mar and abrasion additives, and other similar performance enhancing additives may be employed in this invention as required in amounts effective to upgrade the performance of the cured coating and the coating composition. Desirable performance characteristics of the coating include chemical resistance, abrasion resistance, hardness, gloss, reflectivity, appearance, or combinations of these characteristics, and other similar characteristics.

A variety of other optional additives may be used in protective coating compositions and will be familiar to persons having ordinary skill in the art, including those described in Koleske et al., *Paint and Coatings Industry*, April 2003, pages 12-86. For example, the final topcoat compositions may include one or more performance or property enhancing additives such as colorants, dyes, thickeners, heat stabilizers, leveling agents, anti-cratering agents, curing indicators, plasticizers, sedimentation inhibitors, ultraviolet-light absorbers, and the like. Also, for application using factory coating equipment (e.g., curtain coaters), the composition may employ additives tailored to the chosen equipment and installation. Such additives typically are selected on a site-by-site basis using standard methods that will be familiar to persons having ordinary skill in the art.

The coloring composition can be applied by any conventional means known to those skilled in the art, for example by rolling, spraying, ink jet deposition, or brushing it onto the substrate (e.g., concrete surface). In factory applied settings the suitable methods also include curtain coating, and other methods of applying coatings to a moving substrate. Typically, the method of application will affect the final outcome. For example, spraying on the stain will create a more natural look, while brushing will create a more uniform outcome. The use of multiple coats involving different stains will create a greater variety of successful color choices. If desired, one may spray in a pattern or even pre-deposit a "resist" atop the substrate to cause the subsequently applied stain to differentially stain the area where the resist was applied. In one embodiment, the resist is a hydrophobic material, that inhibits the applied stain from wetting the concrete surface. Suitable hydrophobic materials include, for example, waxes (e.g., paraffin wax), oils (e.g., mineral oil), or a volatile hydrophobic solvent (e.g., aromatic 150). Preferred resist materials cause the applied stain to "bead up" on the surface of the concrete. The resist can be applied in any desirable design. In another embodiment a volatile resist is applied to the concrete in a desired pattern, the stain is applied to the concrete and allowed to dry, the volatile hydrophobic resist is allowed to evaporate thus rendering the resist treated area stainable, and subsequent application of stain is applied to the previously resist treated area. In a further embodiment, a volatile hydrophobic resist is applied to the concrete in a desired pattern, the stain is applied to the concrete and allowed to dry, the volatile hydrophobic resist is allowed to evaporate thus rendering the resist treated area stainable, a second application of a volatile hydrophobic resist is applied to the concrete in a desired pattern which is different than the previous pattern, and a subsequent application of stain is applied to the concrete. The above application methods can be repeated several times to form a complex design on the concrete.

EXAMPLES

The following are non-limiting examples of stain compositions that serve to further illustrate advantages of the disclosed invention.

Example 1

This example and the next describe coloring compositions in which the acidic characteristics are developed in situ from ingredients that are easily handled. The urea monohydrochloride is a stable, solid and is a chloride salt of a protonated urea. When dissolved in water, while not intending to be bound by theory, the compound is believed to dissociate into hydrogen ions, aqueous urea species that are believed to include at least urea in equilibrium with a conjugate acid, and chloride anions. When the composition reacts with a cementitious substrate, it is believed that at least a portion of the aqueous urea species decompose into products including ammonia and carbonic acid. The carbonic acid in turn decomposes to water and $CO_2$. The ammonia is a stronger base than the urea, and the formation of the stronger base could help self-neutralization of the composition. Potentially, the degradation of the urea also may release additional acidic species to enhance the etching performance of the composition. Schematically, the urea or bases with similar decomposition characteristics can be viewed as shielding and controllably releasing the acid potential of the composition, thus rendering the acid safer to use and yet still be effective. The $FeCl_2$ is not only a salt that provides coloring action, but it is also a Lewis acid. In aqueous solution, the dissociation of one mole of this salt is believed to generate about two moles of hydrogen ions.

| Material | Weight (lb) | Vol (gal.) |
|---|---|---|
| Water | 54.75 | 6.57 |
| Urea monohydrochloride | 9 | 0.89 |
| 32% $FeCl_2$ solution | 37.5 | 3.51 |
| Silicone defoamer* | 0.1 | 0.011 |
| Total | 101.35 | 10.98 |

*Proprietary commercially available foam destroying polymers and polysiloxanes

This example provides for a "fawn" or tan colored stain material.

Example 2

| Material | Weight (lb) | Vol (gal.) |
|---|---|---|
| Water | 48.26 | 5.79 |
| Urea monohydrochloride | 9 | 0.89 |
| $CuCl_2 \cdot 2H_2O$ | 15.3 | 0.72 |
| Water | 18 | 2.16 |
| 32% $FeCl_2$ solution | 9 | 0.84 |
| Silicone defoamer* | 0.1 | 0.012 |
| Total | 99.66 | 10.41 |

*Proprietary commercially available foam destroying polymers and polysiloxanes

This example provides for an olive-colored or green stain material.

Example 3

| Material | Weight (lb) | Vol (gal.) |
|---|---|---|
| Water | 19.89 | 2.38 |
| Urea monohydrochloride | 9.89 | 0.98 |
| Silicone defoamer* | 0.1 | 0.011 |
| $FeCl_2$ solution, 40% | 31.25 | 2.67 |
| $MnCl_2 \cdot 4H_2O$ | 21.43 | 1.27 |

-continued

| Material | Weight (lb) | Vol (gal.) |
|---|---|---|
| Urea monohydrochloride | 1.75 | 0.17 |
| Water | 15.78 | 1.89 |
| Total | 100.09 | 9.37 |

*Proprietary commercially available foam destroying polymers and polysiloxanes

This example provides for a "coffee" or brownish colored stain material.

Example 4

The "fawn" colored stain material from Example 1 was applied to a cement fiber board substrate and allowed to dry. A fawn color developed. The color is more fully realized following application of topcoats described below.

Examples 4a

Electron Beam Curable Topcoat

The resulting stained board from Example 4 was topcoated with an electron beam cured coating comprising 132.5 parts CN991 (Sartomer) and 56.8 parts hexanediol diacrylate (Sartomer). The coating was cured by an electron beam supplied by AEB (Wilmington, Mass.) at 150 kV, 50 feet/minute line speed, oxygen at 500 ppm, and a beam setting of 10. The resulting coating was a hard durable protective topcoat.

Examples 4b

Ultraviolet Curable Topcoat

The resulting stained board from Example 4 was topcoated with an ultraviolet cured coating comprising 132.5 parts CN991 (Sartomer), 56.8 parts hexanediol diacrylate (Sartomer), and 10 parts KIP100 (Sartomer). The coating was cured by two 300 watt/inch medium pressure mercury lamps at a line speed of 60 feet per minute The resulting coating was a hard durable protective topcoat.

Examples 4c

Thermoplastic Topcoat

The resulting stained board from Example 4 was topcoated with a waterbased latex/fluoropolymer blend coating comprising 159.1 parts XK-90 (DSM, Elgin, Ill.), 143.19 parts Lumiflon 4300 (Asahi Glass Company), and 25 parts water. The coating was dried in a 300° F. (149° C.) oven until a board surface temperature of 200° F. (93.3° C.) was achieved.

The resulting coating was a hard durable protective topcoat.

Examples 4d

Ultraviolet Curable Topcoat

The resulting stained board from Example 4 is topcoated with a waterbased ultraviolet cured coating consisting of 100 parts Bayhydrol UV LS 2317 and 1.5 parts Irgacure 500 (Ciba). The coating is cured by either first air drying until "dry to touch" or drying in a 300° F. (149° C.) hot air oven to a BST (board surface temperature) of approximately 160 to 180° F. (71 to 82° C.) followed by two 300 watt/inch medium pressure mercury lamps at a line speed of 60 feet per minute.

The resulting coating is expected to be a hard durable protective topcoat.

Example 5

The "coffee" colored stain material from Example 3 was applied to a cement fiber board substrate and allowed to dry.

Examples 5a

Electron Beam Curable Topcoat

The resulting stained board from Example 5 was topcoated with an electron beam cured coating comprising 132.5 parts CN991 (Sartomer) and 56.8 parts hexanediol diacrylate (Sartomer). The coating was cured by an electron beam supplied by AEB (Wilmington, Mass.) at 150 kV, 50 feet/minute line speed, oxygen at 500 ppm, and a beam setting of 10.

The resulting coating was a hard durable protective topcoat.

Examples 5b

Ultraviolet Curable Topcoat

The resulting stained board from Example 5 was topcoated with an ultraviolet cured coating comprising 132.5 parts CN991 (Sartomer), 56.8 parts hexanediol diacrylate (Sartomer), and 10 parts KIP100 (Sartomer). The coating was cured by two 300 watt/inch medium pressure mercury lamps at a line speed of 60 feet per minute The resulting coating was a hard durable protective topcoat.

Examples 5c

Thermoplastic Topcoat

The resulting stained board from Example 5 was topcoated with a waterbased latex/fluoropolymer blend coating comprising 159.1 parts XK-90 (DSM, Elgin, Ill.), 143.19 parts Lumiflon 4300 (Asahi Glass Company), and 25 parts water. The coating was dried in a 300° F. (149° C.) oven until a board surface temperature of 200° F. (93.3° C.) was achieved.

The resulting coating was a hard durable protective topcoat.

Examples 5d

Ultraviolet Curable Topcoat

The resulting stained board from Example 5 is topcoated with a waterbased ultraviolet cured coating consisting of 100 parts Bayhydrol UV LS 2317 and 1.5 parts Irgacure 500 (Ciba). The coating is cured by either first air drying until "dry to touch" or drying in a 300° F. (149° C.) hot air oven to a BST (board surface temperature) of approximately 160 to 180° F. (71 to 82° C.) followed by two 300 watt/inch medium pressure mercury lamps at a line speed of 60 feet per minute.

The resulting coating is expected to be a hard durable protective topcoat.

These embodiments or examples should be considered to be non-limiting and are presented to illustrate just a few of the possibilities of the compositions and methods of the present invention. While the principles of this invention have been described in connection with specific embodiments, it should be clearly understood that these descriptions are made only by way of example and are not intended to limit the scope of the invention. As such, the present invention may be embodied in other specific forms without departing from the spirit or essential attributes thereof, and, accordingly, reference should be made to the appended claims, rather than to the foregoing specification as indicating the scope of the invention.

We claim:

1. A method, comprising:
   (a) obtaining a composition derived from ingredients including (i) a first acid which has a pKa less than 6; (ii) a weak base, wherein the conjugate acid of the weak base has a pKa less than 7 and greater than the pKa of the first acid; and (iii) one or more metal salts that impart a color to a surface of a cementitious or mineral substrate when the composition is in contact with and reacts with the surface;
   (b) wetting the surface with the composition;
   (c) permitting the composition to react with the substrate surface and develop color; and
   (d) allowing the substrate surface to dry.

2. The method of claim 1, wherein the substrate comprises a fibercement building product.

3. The method of claim 1, wherein the first acid has a pKa less than 1.

4. The method of claim 1, wherein in the one or more metal salts comprise a salt of the transition elements.

5. The method of claim 1, wherein the weak base can decompose upon application to the substrate into one or more components that comprise another base.

6. The method of claim 1, wherein the weak base can decompose upon application to the substrate into one or more components that have a vapor pressure greater than 0.01 psi at 25° C.

7. The method of claim 1, wherein the first acid comprises a hydrogen halide.

8. The method of claim 1, wherein in the weak base comprises urea.

9. The method of claim 1, wherein the one or more metal salts comprise at least one of a chloride, sulfate, nitrate, nitrite, phosphate, or phosphonate salts of titanium, vanadium, chromium, manganese, iron, cobalt, nickel, copper, aluminum, magnesium, or barium.

10. The method of claim 1, wherein the composition further comprises a metal ion complexing agent.

11. The method of claim 1, further comprising the step of neutralizing the colored surface.

12. The method of claim 1, further comprising the step of: applying an at least partially transparent protective coating over at least a portion of the colored surface.

13. The method of claim 1, further comprising the step of: applying a hydrophobic resist to the surface prior to application of the composition.

14. A stained cementitious or mineral substrate prepared according to the method of claim 1.

15. A stained cementitious or mineral substrate prepared according to the method of claim 2.

16. A method, comprising the steps of:
   a) applying to the surface of a fiber cement substrate composition comprising a reaction mixture of (i) a first acid which has a pKa less than 6; (ii) a weak base, wherein the conjugate acid of the weak base has a pKa less than 7 and greater than the pKa of the first acid; and (iii) one or more metal salts that impart a color when the composition is applied to and reacts with the fiber cement substrate;
   b) causing the composition to react with the substrate and develop color; and
   c) applying a protective coating to cover the fibercement surface.

17. The method of claim 16, wherein the protective coating is derived from ingredients comprising at least one radiation curable component, and wherein step (c) comprises curing the protective coating using radiation.

18. A method, comprising the steps of:
   (a) incorporating a salt of a protonated base into an aqueous liquid carrier, said protonated base having a pKa of less than about 7;
   (b) incorporating a salt of a transition metal into the aqueous liquid carrier; and
   (c) causing the aqueous liquid carrier to contact and react with a cementitious surface so as to color the cementitious surface; and
   (d) drying the cementitious surface.

19. The method of claim 18, further comprising the step of applying a protective polymer coating to cover the colored cementitious surface.

20. The method of claim 18, wherein the cementitious surface is a surface of a siding product comprising fiber cement.

21. The method of claim 19, wherein the protective polymer coating is derived from ingredients comprising at least one radiation curable ingredient, and wherein the protective coating is radiation cured.

22. A system, comprising:
   (a) a cementitious surface; and
   (b) an aqueous composition in contact with the surface so that the composition can react with the surface and develop color, the composition derived from ingredients comprising (i) aqueous species comprising a weak base in equilibrium with a conjugate acid of the weak base, said conjugate acid of the weak base having a pKa of less than about 7; and (ii) aqueous species comprising a transition metal ion and a corresponding anion, wherein the salt corresponding to the transition metal ion and the anion is a Lewis acid.

* * * * *